United States Patent
Tezuka

(10) Patent No.: US 12,554,242 B2
(45) Date of Patent: Feb. 17, 2026

(54) WAVEFORM DISPLAY DEVICE

(71) Applicant: FANUC CORPORATION, Yamanashi (JP)

(72) Inventor: Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 389 days.

(21) Appl. No.: 18/042,416

(22) PCT Filed: Aug. 31, 2021

(86) PCT No.: PCT/JP2021/031857
§ 371 (c)(1),
(2) Date: Feb. 21, 2023

(87) PCT Pub. No.: WO2022/050254
PCT Pub. Date: Mar. 10, 2022

(65) Prior Publication Data
US 2023/0324877 A1 Oct. 12, 2023

(30) Foreign Application Priority Data
Sep. 7, 2020 (JP) .................................. 2020-149974

(51) Int. Cl.
*G06F 3/048* (2013.01)
*G01R 13/02* (2006.01)
(Continued)

(52) U.S. Cl.
CPC ..... *G05B 19/4069* (2013.01); *G01R 13/0245* (2013.01); *G01R 13/0272* (2013.01); *G01R 13/08* (2013.01)

(58) Field of Classification Search
CPC ...... G05B 19/4069; G05B 2219/35321; G05B 2219/35322; G01R 13/0245; G01R 13/0272; G01R 13/08; Y02P 90/02
See application file for complete search history.

(56) References Cited

U.S. PATENT DOCUMENTS

| 2011/0015877 A1* | 1/2011 | Okita | G05B 19/409 |
| | | | 702/41 |
| 2011/0057599 A1* | 3/2011 | Iwashita | G05B 19/4068 |
| | | | 318/601 |
| 2013/0138236 A1* | 5/2013 | Nagaoka | G05B 19/19 |
| | | | 700/108 |

FOREIGN PATENT DOCUMENTS

| CN | 103019154 A | 4/2013 |
| JP | H08-328630 A | 12/1996 |

(Continued)

OTHER PUBLICATIONS

International Search Report issued in PCT/JP2021/031857; mailed Nov. 16, 2021.

*Primary Examiner* — Aleksey Olshannikov
(74) *Attorney, Agent, or Firm* — Studebaker Brackett PLLC

(57) ABSTRACT

Provided is a waveform display device that can easily designate an analysis target range just by selecting a location to be analyzed with regard to a tool trajectory. This waveform display device comprises: a positional information acquisition unit that acquires, from a control device that controls a machine tool, motor positional information for a drive shaft of the machine tool during workpiece machining; a shaft information setting unit that sets shaft information indicating the shaft configuration of the drive shaft of the machine tool; a tool trajectory display unit that calculates the trajectory of a tool tip point during workpiece machining by a tool mounted on the machine tool on the basis of the motor positional information and the shaft information and displays the trajectory as a waveform; an analysis target setting unit that sets an analysis target position relating to the trajectory of the tool tip point; an analysis target range generation unit that generates and displays an analysis target range containing a solid body including the set analysis (Continued)

target position; and a measurement point sorting unit that sorts out and displays a measurement point included in the analysis target range generated by the analysis target range generation unit from within the trajectory of the tool tip point.

4 Claims, 7 Drawing Sheets

(51) Int. Cl.
*G01R 13/08* (2006.01)
*G05B 19/4069* (2006.01)

(56) References Cited

FOREIGN PATENT DOCUMENTS

| | | | |
|---|---|---|---|
| JP | 2003-330512 | A | 11/2003 |
| JP | 2011-022688 | A | 2/2011 |
| JP | 2016-207156 | A | 12/2016 |
| JP | 2021-096525 | A | 6/2021 |
| WO | 2013/118179 | A1 | 8/2013 |
| WO | 2016/027355 | A1 | 2/2016 |

\* cited by examiner

WAVEFORM DISPLAY DEVICE

TECHNICAL FIELD

The present invention relates to a waveform display device.

BACKGROUND ART

A machine tool moves a tool in response to a command from a numerical control device based on a machining program to perform cutting on a workpiece. In the cutting, a path drawn by tool tip points on a machining surface of a workpiece directly affects the machining quality. Therefore, conventionally, a technique is known in which machining path data is generated from a machining program and is displayed on a screen, and thus it is possible to visually check whether a machining operation as designed can be realized (for example, see Patent Document 1).

Patent Document 1: Japanese Unexamined Patent Application, Publication No. H8-328630

DISCLOSURE OF THE INVENTION

Problems to be Solved by the Invention

In a case of analyzing the influence of tool movement on the machining surface of the workpiece, it is necessary to designate a range including measurement points to be analyzed, from a plurality of measurement points on the path of the tool tip points. However, since the range including the measurement points to be analyzed is temporally discontinuous on the machining surface of the workpiece, it is difficult to designate the range with a simple operation.

Therefore, it is desirable to simply designate the range to be analyzed just by selecting a position to be analyzed with respect to the tool path.

Means for Solving the Problems

An aspect of the present disclosure provides a waveform display device comprising: a position information acquisition unit that acquires, from a control device that controls a machine tool, motor position information on a drive shaft of the machine tool; a shaft information setting unit that sets shaft information indicating a shaft configuration of the drive shaft of the machine tool; a tool path display unit that, based on the motor position information acquired by the position information acquisition unit and the shaft information set by the shaft information setting unit, calculates a path of tool tip points of a tool attached to the machine tool and displays the calculated path as a waveform; an analysis object setting unit that sets an analysis object position related to the path of tool tip points displayed by the tool path display unit; an analysis object range generation unit that generates and displays a three-dimensional analysis object range including the analysis object position set by the analysis object setting unit; and a measurement point selection unit that selects a measurement point included in the analysis object range generated by the analysis object range generation unit from the path of tool tip points and displays the selected measurement point.

Effects of the Invention

According to an aspect, it is possible to provide a waveform display device capable of simply designating a range to be analyzed just by selecting a position to be analyzed with respect to a tool path.

PREFERRED MODE FOR CARRYING OUT THE INVENTION

Figure 1:
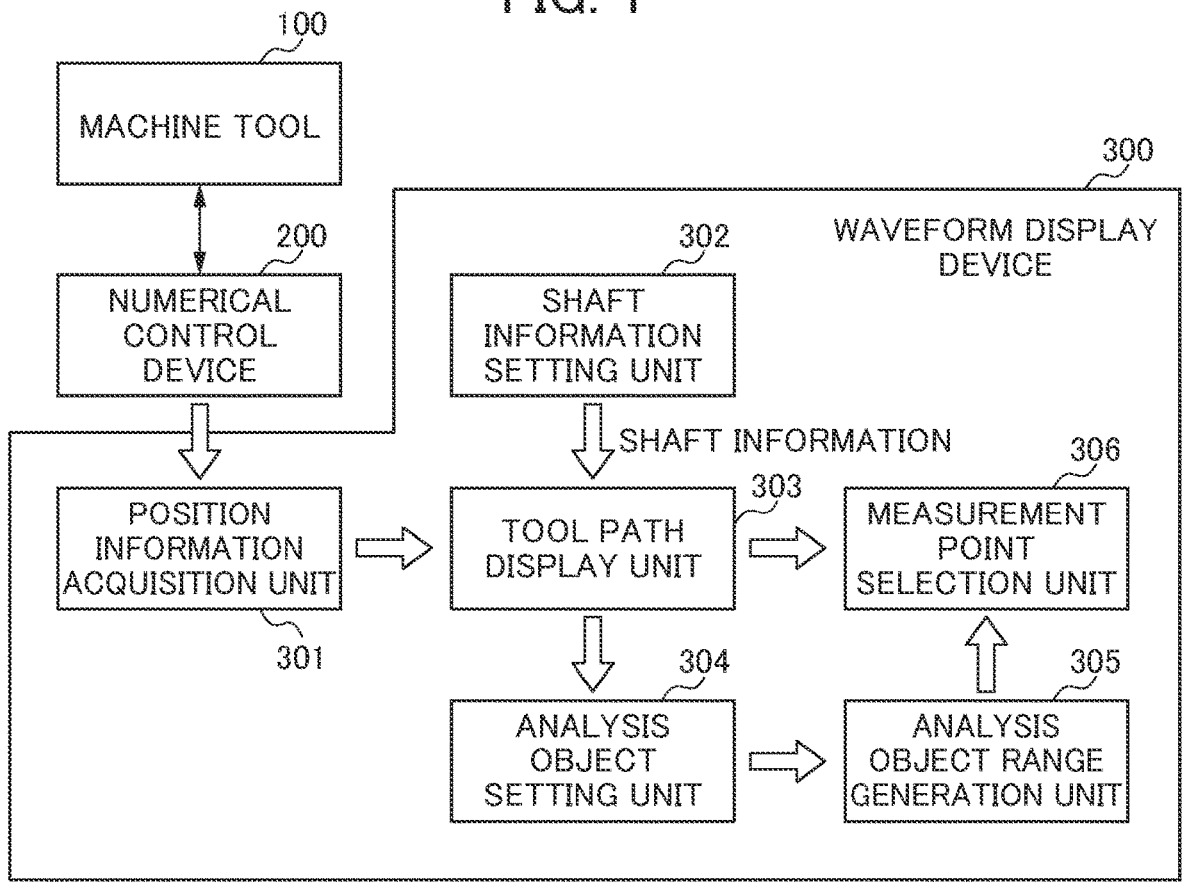
FIG. 1 is a functional block diagram showing a functional configuration example of a numerical control system according to an embodiment.

An embodiment of the present disclosure will be described below with reference to the drawings. As shown in FIG. 1, a numerical control system includes a machine tool 100, a numerical control device 200, and a waveform display device 300. The machine tool 100, the numerical control device 200, and the waveform display device 300 are directly connected to each other via a connection interface (not shown). Further, the machine tool 100, the numerical control device 200, and the waveform display device 300 may be connected to each other via a network (not shown) such as a LAN (Local Area Network) or the Internet.

The machine tool 100 includes a drive shaft (not shown) including one or more servo motors that operates under numerical control of the numerical control device 200. The machine tool 100 feeds back information indicating an operating state based on an operation command of the numerical control device 200 to the numerical control device 200. The information indicating the operating state includes servo-motor position information (hereinafter, referred to as motor position information) indicating a position of the drive shaft. Specifically, the motor position information includes information on a motor command position output from the numerical control device 200 to the servo motor and information on an actual motor position when the servo motor is driven by the motor command position.

The numerical control device 200 controls an operation of the machine tool 100. The numerical control device 200 is a control device known to those skilled in the art.

The waveform display device 300 includes a position information acquisition unit 301, a shaft information setting unit 302, a tool path display unit 303, an analysis object setting unit 304, an analysis object range generation unit 305, and a measurement point selection unit 306.

The waveform display device 300 includes an arithmetic operation processing device (not shown) such as a CPU (Central Processing Unit) in order to realize operations of functional blocks in FIG. 1. Further, the waveform display device 300 includes an auxiliary storage device (not shown) such as a ROM (Read Only Memory) or HDD (Hard Disk Drive) that stores various control programs, and a main storage device (not shown) such as a RAM (Random Access Memory) that stores data temporarily required when the arithmetic operation processing device executes a program.

In the waveform display device 300, the arithmetic operation processing device reads an OS and application software from the auxiliary storage device, and performs arithmetic operation processing based on the OS and the application software while developing the read OS and application software in the main storage device. Based on the arithmetic operation result, the waveform display device 300 controls each of pieces of hardware. Thus, the processing by the functional blocks in FIG. 1 is realized. In other words, each function of the waveform display device 300 is realized by cooperation of hardware and software.

The position information acquisition unit 301 samples and acquires, from the numerical control device 200, motor position information indicating the position of the drive shaft of the machine tool 100 during machining of a workpiece, with a predetermined frequency. The position information acquisition unit 301 outputs the acquired motor position information to the tool path display unit 303.

Shaft information indicating a shaft configuration of the drive shaft of the machine tool 100 is set in the shaft information setting unit 302. The shaft information includes information on a type, a length, a shape and the like of the tool attached to the machine tool 100. The shaft information setting unit 302 outputs the shaft information to the tool path display unit 303.

The tool path display unit 303 calculates a path of tool tip points based on the motor position information acquired by the position information acquisition unit 301 and the shaft information acquired by the shaft information setting unit 302. The path of the tool tip points is a moving path drawn by the tip of the tool attached to the machine tool 100 when the machine tool 100 operates based on the machining program. Specifically, the tool path display unit 303 calculates coordinates (Xt, Yt, Zt) of each of the tool tip points based on the sampled motor position information and shaft information. A well-known method can be used for calculating the coordinates.

In Formula (1) below, parameters a, b, c, and d are set in the tool path display unit 303 to indicate a reference surface, which is a target machining surfaced of the workpiece.

$$ax+by+cz=d \quad (1)$$

The parameters are set by a user's input operation using an external device such as a PC or a tablet terminal connected to the waveform display device 300, for example. A normal vector of the reference surface in Formula (1) is in a direction in which an inner product with the tool vector is positive. The tool vector is a vector directed from the tip to a root of the tool attached to the machine tool 100.

The tool path display unit 303 calculates a distance in the perpendicular direction from the tool tip point to the reference surface, using the coordinates (Xt, Yt, Zt) of the tool tip point. Specifically, the tool path display unit 303 calculates a distance L in the perpendicular direction from the tool tip point to the reference surface, using the coordinate (Xt, Yt, Zt) of each of the plurality of tool tip points and Formula (2) below.

$$L=(aXt+bYt+cZt-d)/(a^2+b^2+c^2)^{1/2} \quad (2)$$

The distance L calculated by Formula (2) indicates a positive polarity when the tool tip point is on a side where the normal vector is directed toward the reference surface and a negative polarity when the tool tip point is on an opposite side of the side where the normal vector is directed toward the reference surface.

Figure 2:
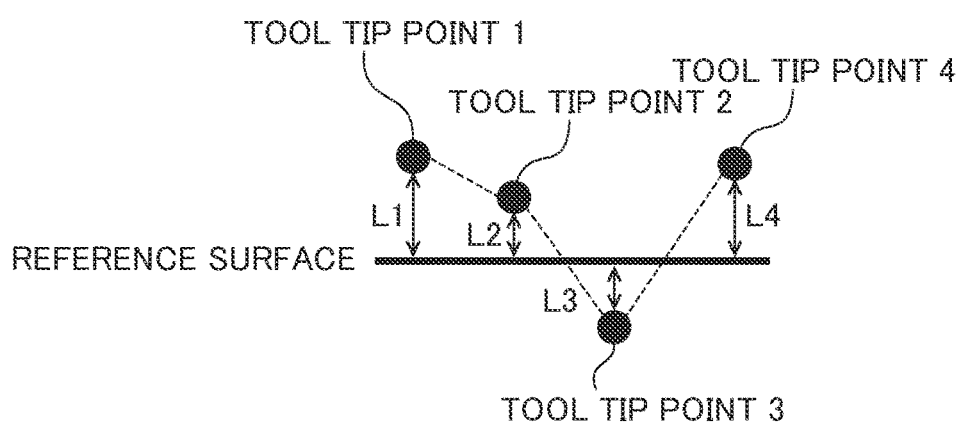
FIG. 2 is a diagram showing an example of a relationship between tool tip points and a reference surface.

FIG. 2 is a diagram showing an example of a relationship between a plurality of tool tip points and a reference surface. FIG. 2 shows distances L1 to L4 in the perpendicular direction of four tool tip points 1 to 4 with respect to the reference surface. A line (a broken line in FIG. 2) connecting the tool tip points 1 to 4 indicates a path of the tool tip points. The path of the tool tip points indicates unevenness information of the machining surface.

Figure 3:
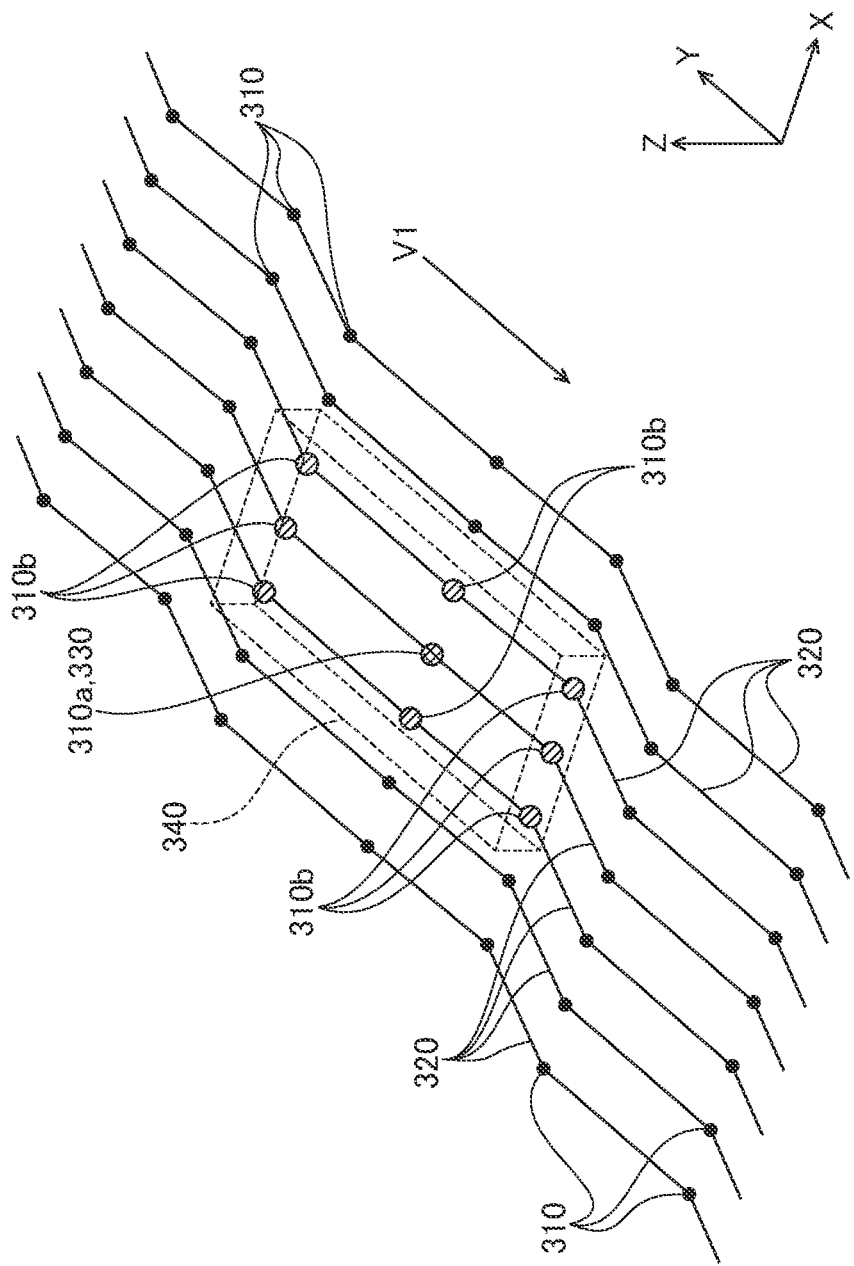
FIG. 3 is a diagram schematically showing an example of a three-dimensional analysis object range including an analysis object position on a path of tool tip points.

The tool path display unit 303 displays, as a waveform, the path of the tool tip points calculated in this way on a screen of a display device (not shown) such as a liquid crystal monitor. The tool tip points based on the sampled motor position information constitute a plurality of measurement points 310 shown in FIG. 3. However, during machining of the workpiece, the tip of the tool moves relatively while changing its position with respect to the machining surface due to the operation of the machine tool 100. For this reason, the path of the tool tip points is displayed as a plurality of waveform lines 320 parallel to each other on the screen of the display device (not shown) as shown in FIG. 3.

The display device (not shown) may be provided in the waveform display device 300, or may be provided in the numerical control device 200. Further, the display device (not shown) may be provided in an external device such as a PC (Personal Computer) or a tablet terminal connected to the numerical control device 200 or the waveform display device 300 in a wired or wireless manner.

The analysis object setting unit 304 sets an analysis object position related to the path of the tool tip points displayed by the tool path display unit 303. The analysis object position is position information for designating a generation position of an analysis object range by the analysis object range generation unit 305 to be described below, and is set by the user's input operation. The analysis object position related to the path of the tool tip points is not limited to a position of an arbitrary measurement point 310 on the path, and may be between the measurement points 310 and 310 adjacent to each other or the waveform lines 320 and 320 adjacent to each other.

An example of a specific method of setting the analysis object position includes a method of setting, as an analysis object position, positions of one or more points selected by a pointing device such as a mouse, a touch panel, or a pen table operated by the user, on the screen on which the path of the tool tip points is displayed. FIG. 3 shows a state in which one measurement point 310a is selected from the plurality of measurement points 310 on the path of the tool tip points by the user and thus the measurement point 310a is set as an analysis object position 330. When the user selects a line segment connecting a plurality of points on the path of the tool tip points, the analysis object position 330 may be set by a position of the line segment. The analysis object setting unit 304 sets the position selected by the user in this way as the analysis object position 330.

Based on the analysis object position 330 set by the analysis object setting unit 304, the analysis object range generation unit 305 generates an analysis object range 340 including the analysis object position 330 on the path of the tool tip points, and the display device (not shown) displays the generated analysis object range 340. Since the path of the tool tip points represents the unevenness information of the machining surface of the workpiece, the analysis object range 340 needs to have a shape that can include the unevenness of the machining surface. For this reason, the analysis object range 340 is a three-dimensional structure including the analysis object position 330 and the plurality of measurement points 310 existing in the vicinity thereof. In the three-dimensional analysis object range 340, a length is a direction along a traveling direction vector of the tool. A width is a direction perpendicular to the traveling direction vector of the tool and the tool vector of the tool. A height is a direction perpendicular to a plane defined by the length and the width.

FIG. 3 shows an example of the analysis object range 340 having a cuboid shape including the analysis object position 330. The plurality of measurement points 310b included in the analysis object range 340 are analysis object measurement points. An orientation of the analysis object range 340 having the cuboid shape, that is, the length direction of the analysis object range 340 is disposed along a traveling direction vector V1 of the tool. Therefore, it is possible to accurately analyze the state of the machining surface of the workpiece in the traveling direction of the tool.

The analysis object range 340 shown in FIG. 3 has a size that includes therein a total of nine measurement points including one measurement point 310a selected by the user as the analysis object position 330 and eight measurement points 310b existing in the vicinity thereof. However, the size (length×width×height) of the analysis object range 340 is not limited as long as the analysis object range 340 has a size that can large enough to include a plurality of measurement points 310b including the analysis object position 330. Information on the size of the analysis object range 340 is set in advance in a storage unit (not shown) provided in the analysis object range generation unit 305 or the waveform display device 300. The size of the analysis object range 340 set in the storage unit is not limited to one type, and may be a plurality of types according to the shape of the machining surface of the workpiece.

The measurement point selection unit 306 selects, from the path of the tool tip points, the measurement point on the waveform line 320 included in the analysis object range 340 generated by the analysis object range generation unit 305, and displays the selected measurement point on the display device (not shown). In other words, when the analysis object range generation unit 305 generates the analysis object range 340 as shown in FIG. 3, the measurement point selection unit 306 enlarges and displays the analysis object range 340 on the screen of the display device (not shown). Thus, the user can easily and visually check and analyze the state of the machining surface of the workpiece within the analysis object range 340.

Figure 4:
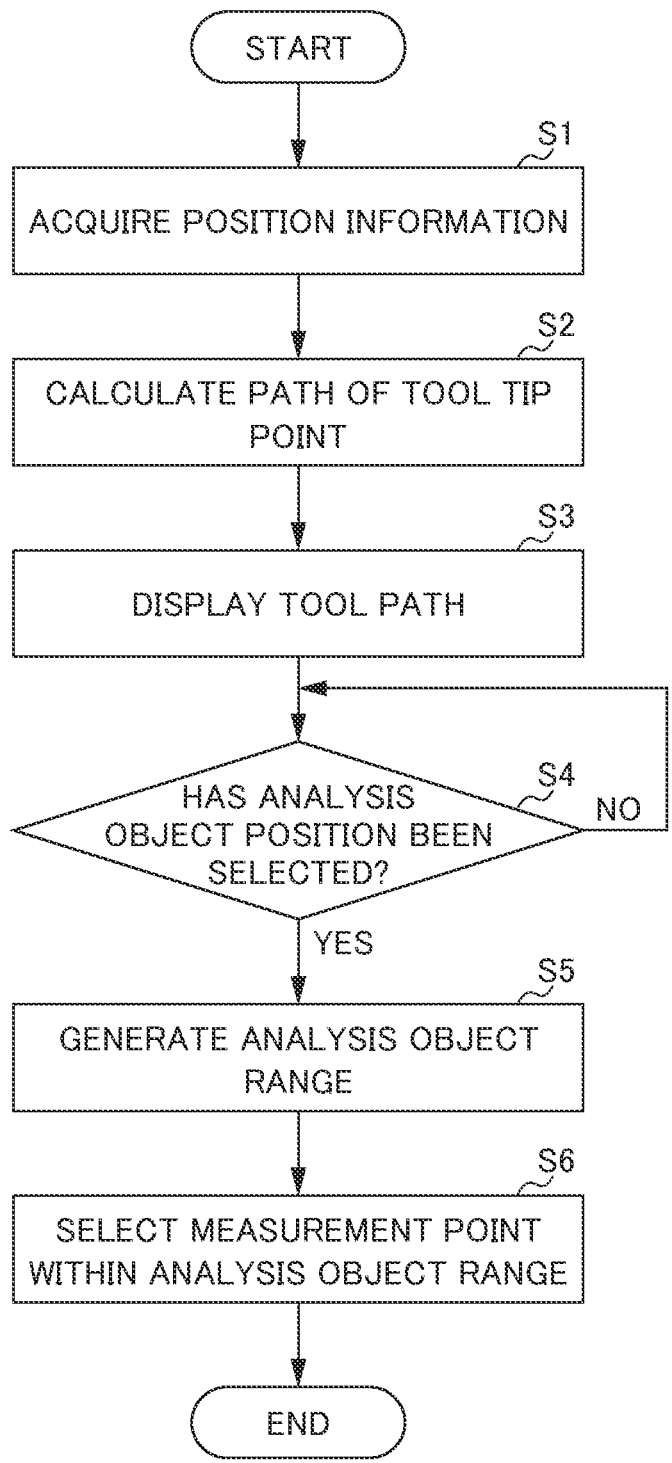
FIG. 4 is a flowchart showing display processing of a waveform display device.

Next, a specific display processing operation in the waveform display device 300 will be described with reference to a flowchart in FIG. 4. The display operation of the waveform display device 300 shown in the following flowchart is executed based on an instruction from the user before the workpiece is actually machined by the machine tool 100.

First, the waveform display device 300 uses the position information acquisition unit 301 to sample and acquire, from the numerical control device 200, motor position information indicating the position of the drive shaft of the machine tool 100 during machining of the workpiece. The waveform display device 300 outputs the motor position information and the shaft information indicating the shaft configuration of the drive shaft of the machine tool 100 set by the shaft information setting unit 302 to the tool path display unit 303 (Step S1).

Next, the waveform display device 300 causes the tool path display unit 303 to calculate the path of the tool tip points based on the motor position information and the shaft information (Step S2) and to display the calculated path of the tool tip points on the screen of the display device (not shown) (Step S3).

In Step S3, after the path of the tool tip points is displayed on the display device (not shown), the waveform display device 300 determines whether the user selects the analysis object position (Step S4).

Figure 5:
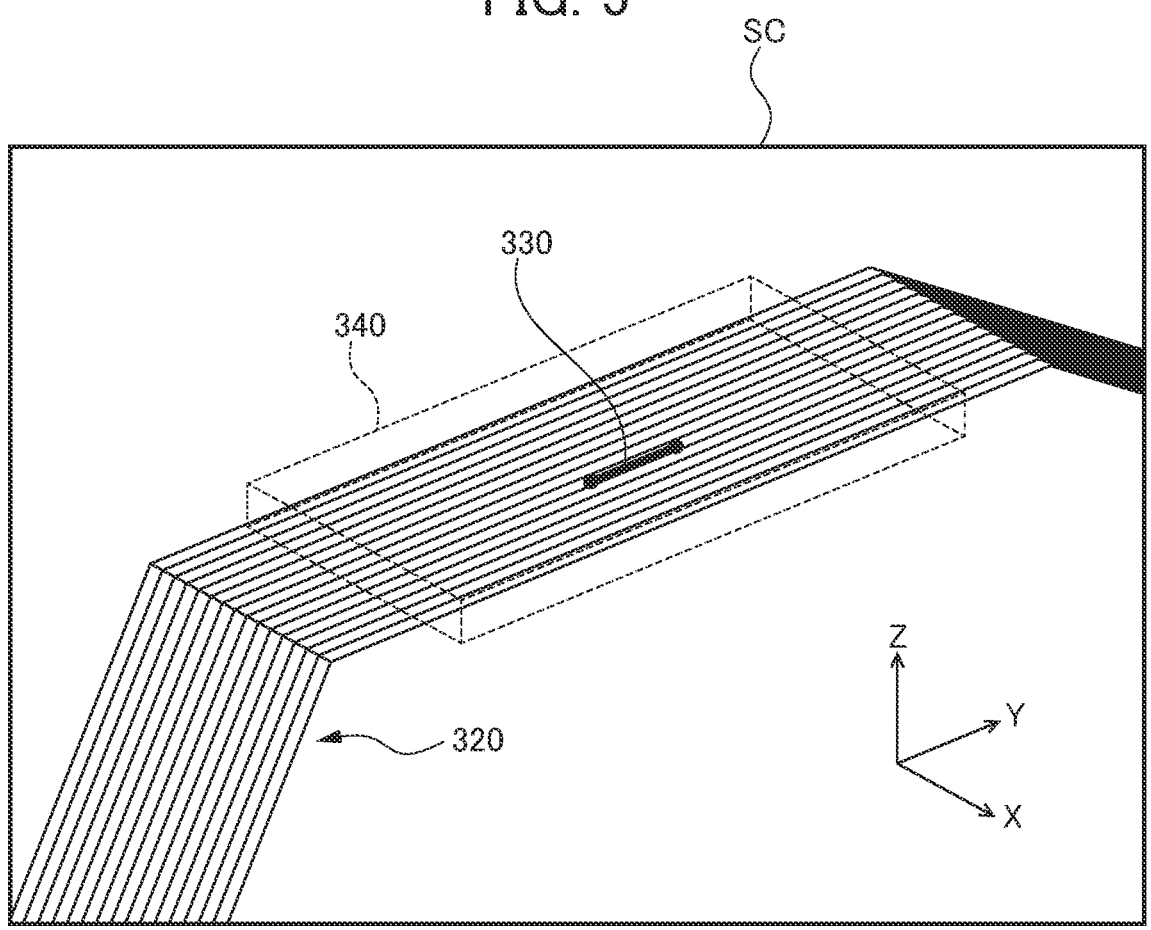
FIG. 5 is a diagram showing an example of a screen on which an analysis object range is displayed.

FIG. 5 shows a screen SC being in a state in which the user selects the analysis object position 330 on a plurality of waveform lines 320 representing the path of the tool tip points. In the screen SC, the analysis object position 330 is indicated by a line segment connecting two points selected by the user. The waveform lines 320 representing the path of the tool tip points indicate a polygonal machining surface of the workpiece.

In this way, when the user selects the analysis object position 330 in Step S4 (Step S4; YES), the waveform display device 300 causes the analysis object setting unit 304 to set the position selected by the user as the analysis object position 330, and then causes the analysis object range generation unit 305 to generates an analysis object range 340 based on the analysis object position 330 and display it on the screen SC (Step S5). As shown in FIG. 5, the analysis object range 340 is displayed by being superimposed on the plurality of waveform lines 320 representing the path of the tool tip points. When the user does not designate the analysis object position 330 in Step S4 (Step S4: NO), the process repeats Step S4, and waits for the designation of the analysis object position 330 from the user.

After the analysis object range 340 is generated in Step S5, the waveform display device 300 causes the measurement point selection unit 306 to select a plurality of measurement points included in the analysis object range 340 displayed on the screen SC and enlarge and display it on the screen SC (Step S6).

Figure 6:
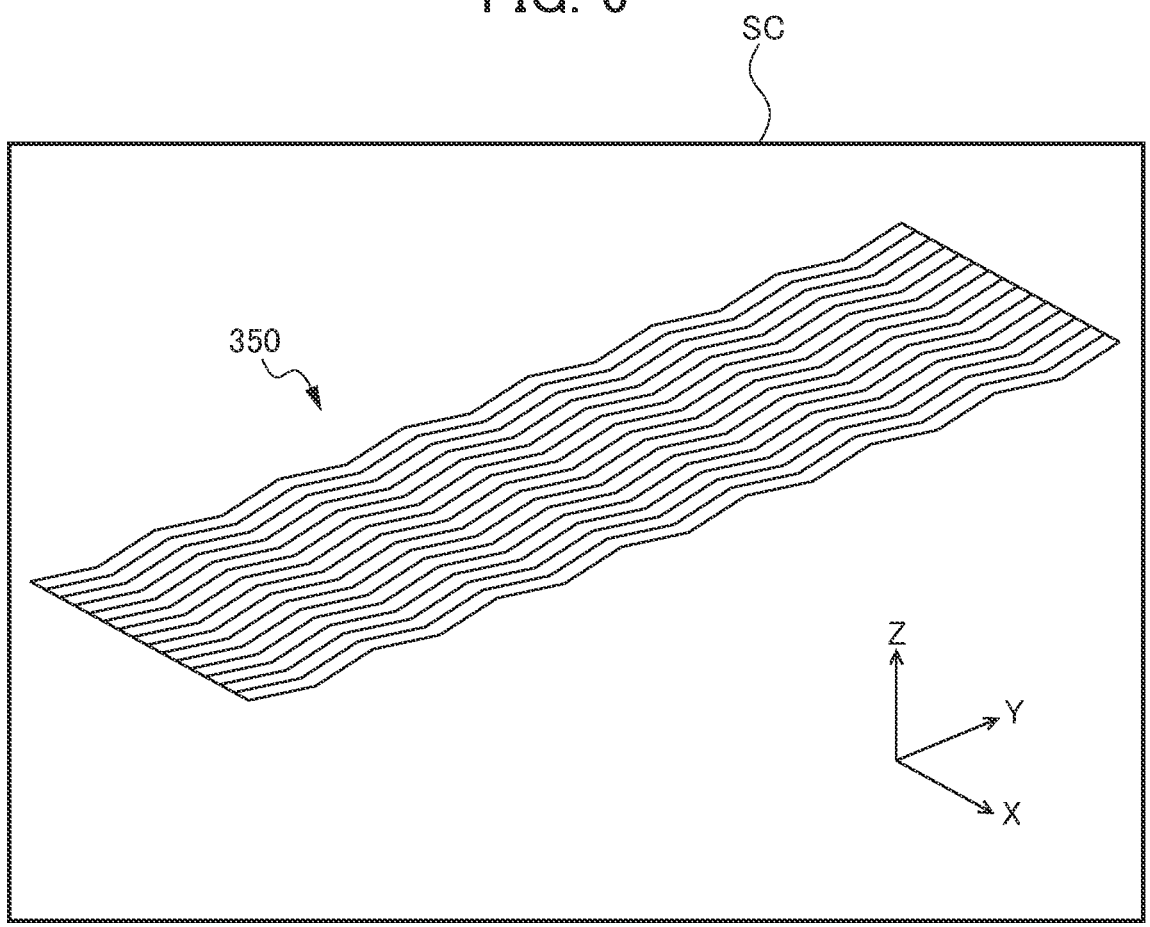
FIG. 6 is a diagram showing an example of a screen on which measurement points within an analysis object range are selected and displayed.

FIG. 6 shows an example of a screen SC on which measurement points within the analysis object range 340 are selected and displayed. A plurality of measurement points within the analysis object range 340 are represented on the screen SC as a plurality of waveform lines 350 representing the path of the tool tip points. The plurality of waveform lines 350 are that the path of the tool tip points within the analysis object range 340 shown in FIG. 5 is enlarged and displayed. Therefore, the user can easily and visually check the unevenness state of the machining surface of the workpiece by observing the path of the tool tip points including the plurality of waveform lines 350 displayed on the screen SC. After the measurement points are selected and displayed in this way, the waveform display device 300 ends the display processing operation.

In the measurement point selection unit 306, the measurement point (the plurality of waveform lines 350) displayed on the screen SC may be displayed in different colors using gradation according to the degree of unevenness with respect to the reference surface. Accordingly, the user can more easily and visually check the unevenness state of the machining surface of the workpiece.

As described above, the waveform display device 300 of the present embodiment includes: the position information acquisition unit 301 that acquires, from the numerical control device 200 that controls the machine tool 100, the motor position information on the drive shaft of the machine tool 100; the shaft information setting unit 302 that sets shaft information indicating the shaft configuration of the drive shaft of the machine tool 100; the tool path display unit 303 that, based on the motor position information acquired by the position information acquisition unit 301 and the shaft information set by the shaft information setting unit 302, calculates the path of tool tip points of the tool attached to the machine tool 100 and displays the calculated path as a waveform; the analysis object setting unit 304 that sets the analysis object position 330 related to the path of tool tip points displayed by the tool path display unit 303; the analysis object range generation unit 305 that generates and displays the three-dimensional analysis object range 340 including the analysis object position 330 set by the analysis object setting unit 304; and the measurement point selection unit 306 that selects the measurement point included in the analysis object range 340 generated by the analysis object range generation unit 305 from the path of tool tip points and displays the selected measurement point. Accordingly, it is possible to simply designate the range including the measurement points to be analyzed just by selecting the position to be analyzed with respect to the tool path. Therefore, the user's analysis work for the machining surface of the workpiece is greatly simplified.

In the present embodiment, the analysis object setting unit 304 sets the analysis object position 330 using one or more points. Accordingly, it is possible for the user to easily analyze a predetermined range of the machining surface just by selecting the position to be analyzed on the screen using one or more points.

In the present embodiment, the analysis object setting unit 304 may set the analysis object position 330 using the line segment connecting the plurality of points. Accordingly, it is possible for the user to easily analyze a predetermined range of the machining surface just by selecting the position to be analyzed on the screen using the line segment.

The analysis object range 340 has the three-dimensional structure in which the direction along the traveling direction vector of the tool is a length, the direction perpendicular to the traveling direction vector and the tool vector of the tool is a width, and the direction perpendicular to a plane defined by the length and the width is a height. Accordingly, it is possible to reliably analyze the unevenness state of the machining surface of the workpiece.

In the present embodiment, the analysis object range 340 has the cuboid shape. The analysis object range 340 having the cuboid shape can be easily formed by setting of the length, the width, and the height. However, the analysis object range 340 can have various shapes according to the shape of the machining surface of the workpiece, and thus is not limited to the cuboid shape.

Figure 7:
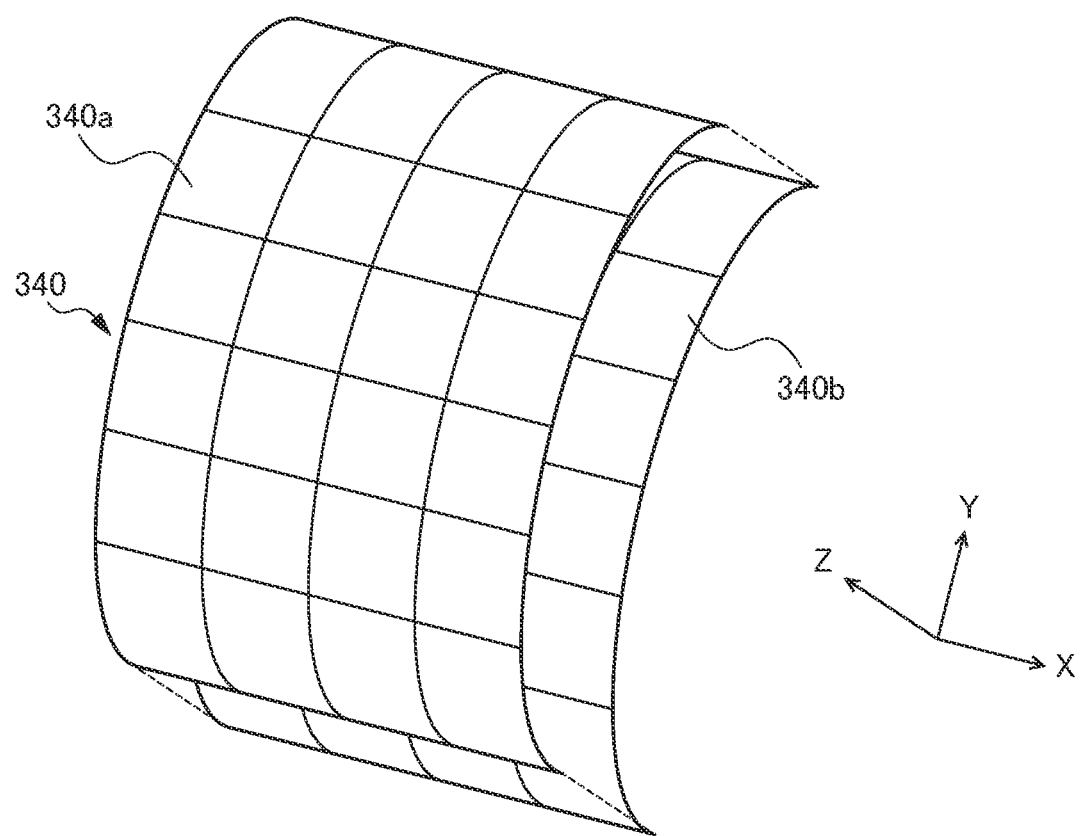
FIG. 7 is a diagram showing an example of a curved analysis object range.

For example, when the machining surface of the workpiece has a curved shape like an impeller blade, the surface of the analysis object range 340 may be a curved surface corresponding to the shape of the machining surface of the workpiece, as shown in FIG. 7. In FIG. 7, two surfaces facing each other in a z-axis direction in the three-dimensional analysis object range 340 are respectively configured by curved surfaces 340*a* and 340*b*. In other words, the analysis object range 340 is defined as a range surrounded by the curved surface 340*a* and the curved surface 340*b*.

The curved surface 340*a* is represented by Formula (3) as follows. The curved surface 340*b* is represented by Formula (4) as follows.

$$z = a_0 x^2 + a_1 y^2 + a_2 xy + a_3 x + a_4 y + a_5 \quad (3)$$

$$z = b_0 x^2 + b_1 y^2 + b_2 xy + b_3 x + b_4 y + b_5 \quad (4)$$

where, $x_{min} \leq x \leq x_{max}$, $y_{min} \leq y \leq y_{max}$.

Figure 8:
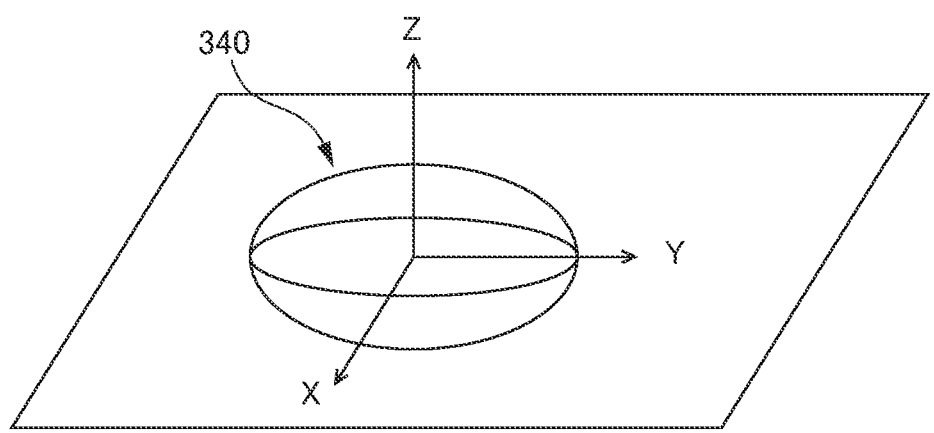
FIG. 8 is a diagram showing an example of an analysis object range of which surface is an oval spherical surface.

The analysis object range 340 shown in FIG. 7 is curved in a Y-axis direction, but is not curved in an X-axis direction. Further, the curved surfaces 340*a* and 340*b* are curved in a convex shape in the same direction along a Z-axis. However, the curved surface of the analysis object range 340 may be a spherical surface that curves in the X-axis direction and the Y-axis direction and curves in a convex shape in an opposite direction along the Z-axis direction according to the shape of the machining surface of the workpiece. FIG. 8 shows an analysis object range 340 of which surface is an oval spherical surface. The oval spherical surface is represented by Formula (5) as follows.

$$ax^2 + by^2 + cz^2 = d \quad (5)$$

Although not shown, the curved surface of the analysis object range 340 may be curved in a concave shape in the Z-axis direction, or may be curved in a convex shape or in a concave shape only in one direction such as the Z-axis direction.

EXPLANATION OF REFERENCE NUMERALS

100 machine tool
200 numerical control device
300 waveform display device
301 position information acquisition unit
302 shaft information setting unit
303 tool path display unit
304 analysis object setting unit
305 analysis object range generation unit
306 measurement point selection unit
330 analysis object position
340 analysis object range

The invention claimed is:

1. A waveform display device comprising a processor configured to perform following operations including:
   acquiring, from a control device that controls a machine tool, motor position information on a drive shaft of the machine tool;
   setting shaft information indicating a shaft configuration of the drive shaft of the machine tool;
   based on the motor position information acquired and the shaft information set, calculating, using coordinates of a plurality of tool tip points along traveling directions of tools attached to the machine tool, distances in a perpendicular direction of the plurality of tool tip points with respect to a reference surface, which is a machining surface of a workpiece, calculating paths of the plurality of tool tip points by a line connecting each of the plurality of tool tip points, and displays the calculated paths as a plurality of waveform lines parallel to each other which represent unevenness information of the machining surface of the workpiece;
   setting an analysis object position related to the paths of plurality of tool tip points displayed as a line segment connecting one or more points or a plurality of points for the plurality of waveform lines parallel to each other;
   generating and displaying a three-dimensional analysis object range including the analysis object position set; and
   selecting a measurement point included in the analysis object range generated from the paths of the plurality of tool tip points, and enlarging and displaying the selected measurement point.

2. The waveform display device according to claim 1, wherein the analysis object range has a three-dimensional structure in which a direction along a traveling direction vector of the tool is a length, a direction perpendicular to the traveling direction vector and a tool vector of the tool is a width, and a direction perpendicular to a plane defined by the length and the width is a height.

3. The waveform display device according to claim 1, wherein the analysis object range has a cuboid shape.

4. The waveform display device according to claim 1, wherein a surface of the analysis object range is a curved surface.

\* \* \* \* \*